INVENTOR.
ROLF H. GARDEY,
BY
Berman, Davidson & Berman
ATTORNEYS.

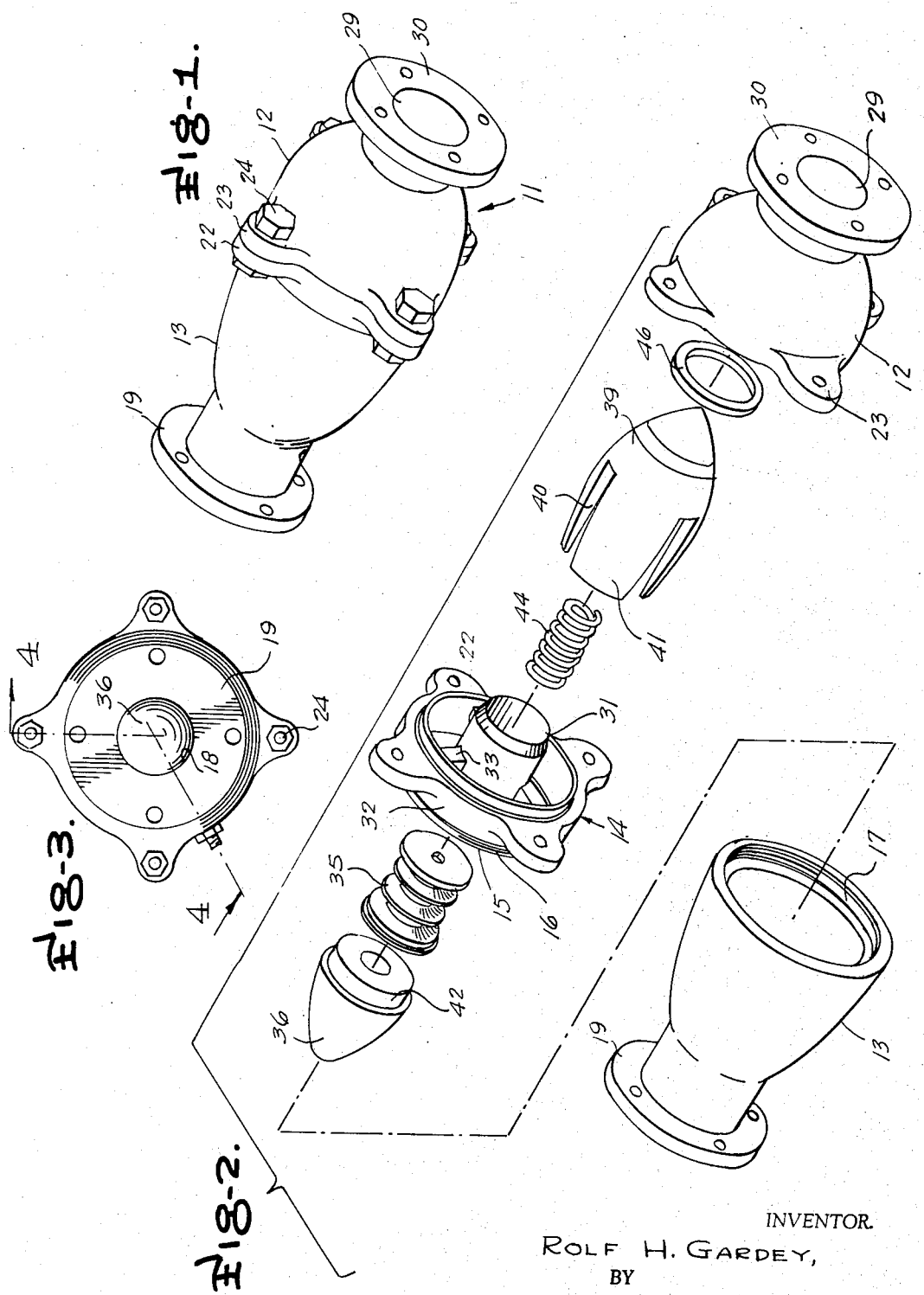

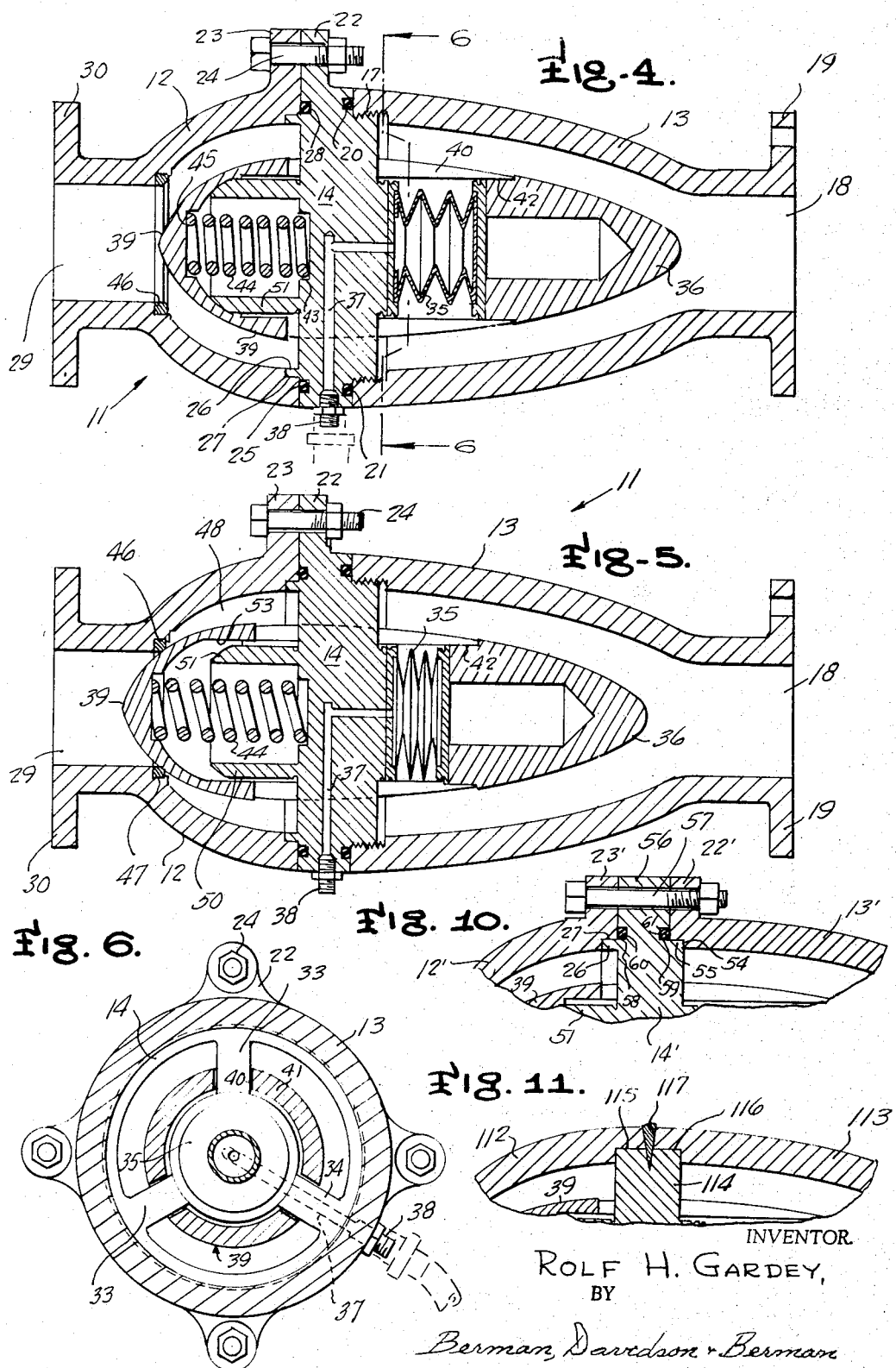

United States Patent Office 3,359,997
Patented Dec. 26, 1967

3,359,997
FLOW-CONTROL VALVE
Rolf H. Gardey, 4806 NE. 21st Ave.,
Fort Lauderdale, Fla. 33308
Filed May 14, 1965, Ser. No. 455,899
10 Claims. (Cl. 137—219)

ABSTRACT OF THE DISCLOSURE

A pressure-controlled valve consisting of a casing with an inlet conduit at one end and an outlet conduit in communication with the interior of the casing. A fixed support extends into the interior of the casing and a hollow oval-shaped valve element is slidably-mounted on the fixed support for movement toward and away from the throat of the inlet conduit. A coiled spring is mounted in the end portion of the valve element adjacent the inlet conduit and bears between the valve element and the fixed support, urging the valve element toward sealing position. A bellows is mounted in the valve element opposite the spring, connecting the fixed support to the other end of the valve element. A control fluid passage in the support communicates with the interior of the bellows. When control fluid is admitted into the bellows, it expands and overcomes the sealing force of the coiled spring, opening the valve.

---

This invention relates to flow-regulating devices, and more particularly to a flow-control valve of the packless type which is controlled by pressure.

A main object of the invention is to provide a novel and improved flow-control valve to control the flow of liquids and/or gases in flow systems, the valve being relatively simple in construction, being easy to operate, and employing a bellows in place of the packing and actuating hydraulic and/or pneumatic cylinders previously employed in valves intended to accomplish the same purpose.

A further object of the invention is to provide an improved flow-control valve of the bellows-actuated type, the valve having a very wide range of adjustment, minimizing leakage, and requiring a minimum of actuating mechanisms.

A still further object of the invention is to provide an improved flow-control valve which is inexpensive to manufacture, which is durable in construction, whose internal parts are streamlined so as to minimize pressure drop through the valve, and which is of the "fail-safe" type, so that a failure of control pressure will automatically cause the valve to close.

A still further object of the invention is to provide an improved pressure-controlled flow valve which is relatively compact in size, which is highly efficient in operation, which involves a minimum of moving parts, which is well shielded so that it may be safely employed to convey radioactive fluids, and which requires no packing so that sealing, maintenance, temperature and chemical corrosion problems are minimized.

A still further object of the invention is to provide an improved pressure-operated flow-control valve which may be used under highly critical conditions, such as under conditions of high or low temperature, in the presence of radiation fields, with chemically-active or corrosive material, in the presence of magnetic fields, or under conditions of considerable vibration or the like, the valve being reliable in operation and requiring a minimum amount of maintenance.

Further objects and advantages of the invention will become apparent from the following description and claims, and from the accompanying drawings, wherein:

FIGURE 1 is a perspective view of an improved flow-control valve constructed in accordance with the present invention.

FIGURE 2 is a perspective view of the valve of FIGURE 1 with the parts thereof shown in separated positions.

FIGURE 3 is an end elevational view of the valve of FIGURES 1 and 2.

FIGURE 4 is an enlarged longitudinal vertical cross-sectional view taken substantially on the line 4—4 of FIGURE 3 with the valve in open position.

FIGURE 5 is a longitudinal cross-sectional view similar to FIGURE 4, but showing the valve in closed position.

FIGURE 6 is a transverse vertical cross-sectional view taken substantially on the line 6—6 of FIGURE 4.

FIGURE 10 is a fragmentary longitudinal cross-sectional view showing a modified housing construction which may be used in a valve according to the present invention.

FIGURE 11 is a fragmentary longitudinal cross-sectional view showing another modification of housing construction which may be used in a valve according to this invention.

Figure 7:
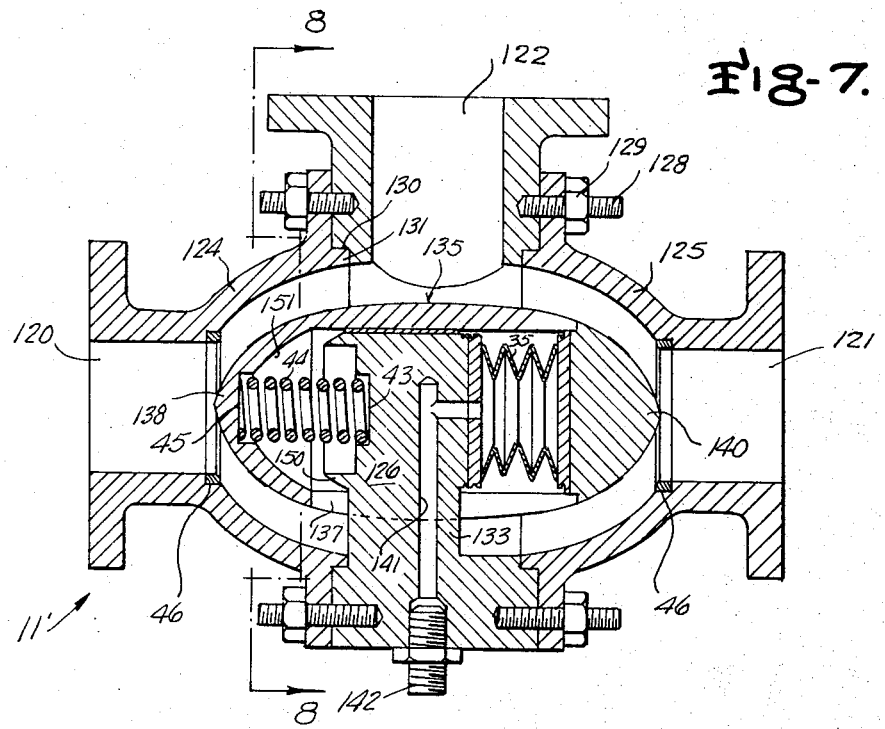
FIGURE 7 is a longitudinal vertical cross-sectional view taken through a modified form of flow-control valve according to the present invention, designed as a fluid-mixing valve.

Referring to the drawings, and more particularly to FIGURES 1 to 6, 11 generally designates one form of flow-control valve according to the present invention. The valve 11 comprises a generally oval elongated casing consisting of a forward segment 12 and a rear segment 13, the rear segment 13 being threadedly engaged on a transverse support member 14, said support member 14 having a rearwardly-extending boss 15 provided with external threads 16 which threadedly engage in internal threads 17 provided in the rim of the rear casing segment 13. As is clearly shown in FIGURE 4, the segment 13 tapers smoothly toward its outlet end 18 and is provided with an annular securing flange 19 adapted to be sealingly connected to the correspondingly-shaped end flange of a conduit section.

The support member 14 is provided adjacent the threads 17 with an annular recess 20 containing an annular sealing ring 21 of resilient deformable material which is engaged by the rim of the casing section 13 as as to make sealing contact therewith.

The support member 14 is provided with a plurality of apertured fastening lugs 22 which are registrable with similar lugs 23 provided on the casing section 12 whereby said casing section 12 may be secured to the support 14 by means of fastening bolts 24, as shown in FIGURE 4. The support member 14 is provided with another annular groove 28 receiving a sealing ring 25 of resilient deformable material which is sealingly engageable with the rim of the section 12 so as to make sealing contact therewith. The forwardly-facing surface of the member 14 is formed with an annular forwardly-projecting rib 26 which is snugly received in a correspondingly-shaped annular recess 27 provided in the rim of casing section 12.

The forward casing section 12 is provided with the fluid inlet opening 29 and is further provided with an annular flange 30 adjacent said fluid inlet opening for connecting the section 12 to the correspondingly-shaped flange of a fluid conduit.

The support member 14 comprises a central hub assembly 31 which is integrally-connected to an outer ring assembly 32 by a plurality of radial arms 33, 33 and 34. Centrally-secured to the rearward side of the hub portion 31 of the support member 14 is one end of an expansible resilient bellows 35, and secured to the other end of the bellows 35 is a tapered cap member 36. The member 14 is formed with a fluid and/or gas passage 37 extending through the radial arm 34 and communicating with the bellows 35 at its inner end, the outer end of the passage 37 communicating with a connection conduit 38 provided at the periphery of the member 14 and adapted to be connected to a suitable conduit leading to the source of control pressure.

Slidably engaged on the hub portion 31 of support member 14 is a valve plug member 39 of generally oval tapering construction, as shown in FIGURE 2, the valve plug member 39 being hollow and being formed with longitudinal slots 40 which receive the respective radial arms 33, 33 and 34 of the support member 14. The slots 40 define respective longitudinal fingers 41, and the rear ends of these fingers are received in an annular recess 42 formed in the cap 36 and are rigidly secured to the cap 36 in the recess 42 so that the member 39 is rigid with the member 36 and together these members define an elongated valve body which is substantially oval in longitudinal cross-sectional shape, and which is spaced inwardly from the inside surfaces of the casing segments 12 and 13 so as to define a substantially streamlined axially-extending inner body providing smooth flow of fluid and/or gases therepast.

Figures 8, 9:
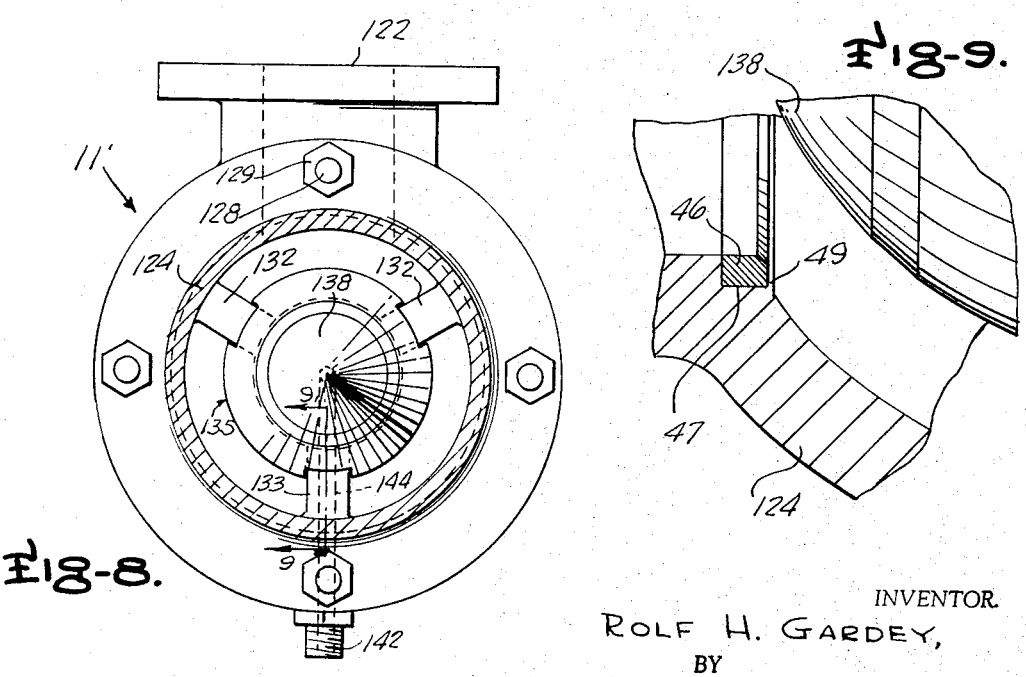
FIGURE 8 is a transverse vertical cross-sectional view taken substantially on the line 8—8 of FIGURE 7.
FIGURE 9 is an enlarged fragmentary cross-sectional detail view taken substantially on the line 9—9 of FIGURE 8.

The support member 14 is provided with a central spring seat 43 which receives one end of a coiled spring 44, the other end of the coiled spring being received in an inner central seat 45 formed in the inside wall surface of the plug member 39, the spring 44 biasing the valve assembly defined by members 39 and 36 leftward, as viewed in FIGURE 4, namely, toward the position shown in FIGURE 5, wherein the plug element 39 sealingly engages against an annular sealing ring 46 disposed in a correspondingly-shaped annular seat 47 provided concentrically around the fluid and/or gas inlet conduit portion 29 and located at the forward end of the cavity 48 defined within the casing section 12. As shown in FIGURE 9, the recess 47 may be provided with an annular inwardly-projecting retaining flange 49 which acts to maintain the ring 46 in its seat 47 and to lock said ring against longitudinal movement.

The hub portion 31 of the support member 14 is integrally-formed with a generally cylindrical axially-extending stop rib 50 which surrounds the coiled spring 44 and which is provided with a beveled end edge 51 conformably-engageable with the inside surface of the plug element 39 to limit the rearward movement of the plug element to the position thereof shown in FIGURE 4, thereby acting as stop means to establish the fully-opened position of the valve.

Under conditions of no-control pressure in passage 37, the spring 44 is allowed to expand to the position thereof shown in FIGURE 5, forcing the bellows 35 to collapse, and allowing the plug element 39 to sealingly-engage the resilient deformable valve-sealing ring 46. This cuts off flow through the valve. When sufficient control pressure is admitted into the passage 37 from the control source, the pressure acting in the bellows 35 causes the bellows to expand, for example, to the maximum expanded condition shown in FIGURE 4, whereby the spring 44 is overcome and the plug element 39 is retracted away from the sealing ring 46, whereby the valve is completely opened. This allows maximum fluid and/or gas flow through the valve. By regulating the degree of the control pressure, the plug element 39 may be adjusted to any position between that shown in FIGURE 4 and that shown in FIGURE 5, to give corresponding modulation or adjustment of the amount of fluid and/or gas flowing through the valve.

The cylindrical member 50 not only acts as a stop means for limiting the opening movement of the plug member 39, but also acts as a guide for said plug member since the plug member is provided with a substantially cylindrical internal bore portion 53 which is substantially slidable relative to the external cylindrical surface of the member 50.

Instead of employing a threaded connection between the outlet portion of the valve casing and the intermediate support member, the front and rear casing segments may be bolted to the intermediate support member in the manner illustrated in FIGURE 10. Thus, in the modified form of the apparatus shown in FIGURE 10, the inlet casing section is shown at 12′ and the outlet casing section is shown at 13′. The intermediate support member is shown at 14′. Forward casing section 12′ is provided with clamping lugs 23′ and rearward casing section 13′ is provided with similar clamping lugs 22′. The rearward casing segment 13′ is provided with an annular recess 54 which receives the second intermediate body portion 55 of support member 14′. The support member 14′ is provided with apertured lugs 56 which are receivable between and registrable with the apertured clamping lugs 23′ and 22′ and through which extend the fastening bolts 57. Sealing rings 58 and 59 are provided in respective annular recesses 60 and 61 provided in member 14′ to sealingly engage the abutting rim portions of the casing segments 12′ and 13′, as is clearly shown in FIGURE 10.

In the modification illustrated in FIGURE 11, the forward casing section is designated at 112 and the rearward casing section is designated at 113. The intermediate support member is designated at 114 and the peripheral edge thereof is received in respective opposing annular recesses 115 and 116 formed in the inner margins of the segments 112 and 113. The parts 112, 114 and 113 are rigidly united by a continuous annular weld 117 in the joint between segments 112 and 113, as is clearly shown in FIGURE 11.

Referring now to the form of the invention illustrated in FIGURES 7, 8 and 9, 11′ generally designates a valve assembly which is employed as a fluid and/or gas pressure-controlled mixing valve to mix fluids and/or gases entering from respective inlet conduit portions 120 and 121, providing a desired proportional mixture of the fluids and/or gases which leave the valve through an outlet conduit portion 122. The assembly 11′ comprises respective identical inlet casing segments 124 and 125 which are rigidly secured through an intermediate support member 126 which is formed integrally with the outlet conduit portion 122. Thus, the parts are fastened together by studs 128 provided with lock nuts 129 as shown in FIGURE 7. The intermediate support member 126 is provided with annular recesses 130 which receive integral marginal ribs 131 formed on the casing segments 124 and 125, providing moisture-tight joints between these parts.

The support member 126 is provided with the radially-extending arms 132, 132 and 133 which extend between the central portion of the support member and the outer portion thereof, and slidably supported on the central portion of the support member 126 is a longitudinally-movable double-acting valve element, shown generally at 135, said valve element being generally oval in longitudinal cross-sectional shape to provide smooth flow of fluid and/or gas therepast. The main body portion of the valve member 135 is hollow and is formed with the longitudinal slots 137 which slidably receive the radial arms 132, 132 and 133. Said main body portion of the valve element has a tapered end 138 which is sealingly-engageable with a sealing gasket 46 seated in the throat portion of the conduit element 120 of casing segment 124. The opposite end of valve element 135 comprises a similarly tapered plug member 140 which is secured to the ends of the arms defined by the slots 137 and which is sealingly-engageable with another resiliently-deformable annular valve ring 46 seated in the throat portion of the conduit element 121 of casing segment 125. An expansible resilient bellows 35 is secured between the plug element 140 and the central portion of the support member 126, as shown in FIGURE 7, and said support member 126 is provided with passage 141 which extends through the arm 133 and which communicates with the interior of the bellows 35 at one end, and with a conduit fitting 142 provided in the outer wall of the support member 126, and adapted to be connected to a source of control pressure.

The side of support member 126 opposite the bellows 35 is provided with a central spring seat 43 receiving one end of a coiled spring 44, the other end of the coiled spring being received in a spring seat 45 provided in the tapered valve plug element 138.

The coiled spring 44 may be of sufficient strength to overcome the normal resiliency of the bellows 35, so that when there is no pressure in the passage 141, the plug element 138 seats on the resilient deformable sealing ring element 46 of casing segment 124, thereby providing closure of the conduit element 120 and full opening of the conduit element 121. Under these conditions, fluid and/or gases admitted through the conduit element 121 will pass through the valve and leave the valve at the outlet conduit 122 without being mixed with fluid and/or gas available at the conduit 120. To provide a mixing action, controlled fluid and/or gas under pressure is admitted through conduit 142 and passage 141 into the bellows 35, causing the bellows to expand, against the biasing force of the coiled spring 44, whereby to move the valve element 135 rightward, as viewed in FIGURE 7, for example, to an intermediate position as shown therein, allowing fluid and/or gas from both conduits 120 and 121 to enter the valve and mix in the intermediate portion thereof, leaving in a mixed condition through the outlet conduit 122. The degree of mixture may be regulated by correspondingly adjusting the pressure of the control media admitted into passage 141. The fluid and/or gas available at conduit 121 may be cut off entirely by increasing the control pressure sufficiently to cause the plug element 140 to sealingly engage with the resilient deformable ring 46. This allows fluid and/or gas only from the conduit 120 to pass through the valve and leave at the outlet conduit 122.

Excessive rightward movement of the valve element 135 is prevented by the provision of an annular stop rib 150 concentric with the seat 43 and being engageable by the inside surface 151 of the hollow plug element 138.

While certain specific embodiments of an improved pressure-controlled valve assembly have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a pressure-controlled valve, a casing having an inlet passage at one end portion thereof, a support in said casing, an expansible resilient bellows secured at one end thereof to said support, said support being formed with a control fluid passage leading to and discharging into said bellows, said casing being provided with outlet passage means, a valve element movably-mounted on said support surrounding said bellows and being secured to the other end of the bellows, said valve element being movable into sealing engagement with said inlet passage, and spring means on the side of the support opposite the bellows biasing said valve element toward said sealing engagement, said spring means acting against the expansive force of the bellows but being overcome when control media under sufficient pressure is admitted into the bellows through said control fluid passage.

2. In a pressure-controlled valve, an elongated casing having an inlet passage at one end thereof, a fixed support in the intermediate portion of the casing, a hollow valve element slidably-mounted on said support and being movable axially in said casing toward and away from said inlet passage, means on the valve element sealingly-engageable with said inlet passage, spring means on one side of the support biasing said valve element toward said sealing engagement, an expansible resilient bellows at the other side of the support, contained in the valve element and connecting the support to the valve element, said bellows acting in opposition to said spring means, said support having a control media passage leading to said bellows, said casing being provided with outlet passage means spaced from said inlet passage, and means to admit control media under pressure into said bellows, said hollow valve element surrounding said bellows and the spring means being on the side of the support opposite the bellows, said spring means acting against the expansive force of the bellows but being overcome when control media under sufficient pressure is admitted into the bellows through said control media passage.

3. In a pressure-controlled valve, an elongated casing having an inlet passage at one end thereof, a fixed support in the intermediate portion of the casing, a hollow valve element slidably-mounted on said support and being movable axially in said casing toward and away from said inlet passage, means on the valve element sealingly-engageable with said inlet passage, spring means contained in the valve element at one side of the support and bearing between said last-named means and the support, biasing said valve element toward said sealing engagement, an expansible resilient bellows at the other side of the support, contained in the valve element and connecting the support to the valve element, said bellows acting in opposition to said spring means, said support having a control media passage leading to said bellows, said casing being provided with outlet passage means spaced from said inlet passage, and means to admit control media under pressure into said bellows, said hollow valve element surrounding said bellows and the spring means being on the side of the support opposite the bellows, said spring means acting against the expansive force of the bellows but being overcome when control media under sufficient pressure is admitted into the bellows through said control media passage.

4. In a pressure-controlled valve, an elongated casing having an inlet passage at one end thereof, a fixed support in the intermediate portion of the casing, a hollow valve element slidably-mounted on said support and being movable axially in said casing toward and away from said inlet passage, means on the valve element sealingly-engageable with said inlet passage, spring means contained in the valve element at one side of the support and bearing between said last-named means and the support, biasing said valve element toward such sealing engagement, an expansible resilient bellows at the other side of the support, contained in the valve element and connecting the support to the portion of the valve element opposite said spring means, said bellows acting in opposition to said spring means, said support having a control media passage leading to said bellows, said casing being provided with outlet passage means spaced from said inlet passage, and means to admit control media under pressure into said bellows, said hollow valve element surrounding said bellows and the spring means being on the side of the support opposite the bellows, said spring means acting against the expansive force of the bellows but being overcome when control media under sufficient pressure is admitted into the bellows through said control media passage.

5. In a pressure-controlled valve, an elongated casing having an inlet passage at one end thereof, a fixed support in the intermediate portion of the casing, a hollow valve element slidably-mounted on said support and being movable axially in said casing toward and away from said inlet passage, means on the valve element sealingly-engageable with said inlet passage, spring means contained in the valve element at one side of the support and bearing between said last-named means and the support, biasing said valve element toward such sealing engagement, and an expansible resilient bellows at the other side of the support, contained in the valve element and connecting the support to the valve element, said bellows acting in opposition to said spring means, said casing being provided with outlet passage means spaced from said inlet passage, said support being formed with a control media passage communicating with the interior of said bellows, said hollow valve element surrounding said bellows and the spring means being on the side of the support opposite the bellows, said spring means acting against the expansive force of the bellows but being overcome when control media under sufficient pressure is admitted into the bellows through said control media passage.

6. In a pressure-controlled valve, an elongated casing having an inlet passage at one end thereof, a fixed support in the intermediate portion of the casing, a hollow valve element slidably-mounted on said support and being movable axially in said casing toward and away from said inlet passage, means on the valve element sealingly-engageable with said inlet passage, spring means contained in the valve element at one side of the support and bearing between said last-named means and the support, biasing said valve element toward such sealing engagement, an expansible resilient bellows at the other side of the support, contained in the valve element and connecting the support to the valve element, said bellows acting in opposition to said spring means, said casing being provided with outlet passage means spaced from said inlet passage, said support being formed with a control media passage communicating with the interior of said bellows, and conduit means on the casing communicating with said last-named passage for admitting control media into the last-named passage said hollow valve element surrounding said bellows and the spring means being on the side of the support opposite the bellows, said spring means acting against the expansive force of the bellows but being overcome when control media under sufficient pressure is admitted into the bellows through said control media passage.

7. In a pressure-controlled valve, an elongated casing having an inlet passage at one end thereof, a fixed support in the intermediate portion of the casing, a hollow valve element slidably-mounted on said support and being movable axially in said casing toward and away from said inlet passage, means on the valve element slidably-engageable with said inlet passage, spring means contained in the valve element at one side of the support and bearing between said last-named means and the support, biasing said valve element toward such sealing engagement, an expansible resilient bellows at the other side of the support, contained in the valve element and connecting the support to the portion of the valve element opposite said spring means, said bellows acting in opposition to said spring means, said support having a control media passage leading to said bellows, said casing being provided with outlet passage means spaced from said inlet passage, and means to admit control media under pressure into said control media passage, said valve element being substantially oval in longitudinal cross-sectional shape to provide smooth flow of fluid therepast, said hollow valve element surrounding said bellows and the spring means being on the side of the support opposite the bellows, said spring means acting against the expansive force of the bellows but being overcome when control media under sufficient pressure is admitted into the bellows through said control media passage.

8. In a pressure-controlled valve, an elongated casing having an inlet passage at one end thereof, a fixed support in the intermediate portion of the casing, a hollow valve element slidably-mounted on said support and being movable axially in said casing toward and away from said inlet passage, means on the valve element sealingly-engageable with said inlet passage, spring means contained in the valve element and bearing between said last-named means and the support, biasing said valve element toward such sealing engagement, and an expansible resilient bellows connecting the support to the portion of the valve element opposite said spring means, said bellows acting in opposition to said spring means, said casing being provided with outlet passage means spaced from said inlet passage, said support being formed with a control media passage communicating with the interior of said bellows, said support being provided with a plurality of radial arms and said valve element having longitudinal slots slidably-receiving said radial arms.

9. In a pressure-controlled valve, an elongated casing having an inlet passage at one end thereof, a fixed support in the intermediate portion of the casing, a hollow valve element slidably-mounted on said support and being movable axially in said casing toward and away from said inlet passage, means on the valve element sealingly-engageable with said inlet passage, spring means contained in the valve element and bearing between said last-named means and the support, biasing said valve element toward such sealing engagement, and an expansible resilient bellows disposed within the valve element and connecting the support to the portion of the valve element opposite said spring means, said bellows acting in opposition to said spring means, said casing being provided with outlet passage means spaced from said inlet passage, said support being formed with a control media passage communicating with the interior of said bellows, said support being provided with a plurality of radial arms and said valve element having longitudinal slots slidably-receiving said radial arms.

10. In a pressure-controlled valve, an elongated casing having an inlet passage at one end thereof, a fixed support in the intermediate portion of the casing, a hollow valve element slidably-mounted on said support and being movable axially in said casing toward and away from said inlet passage, means on the valve element sealingly-engageable with said inlet passage, spring means contained in the valve element and bearing between said last-named means and the support, biasing said valve element toward said sealing engagement, and an expansible resilient bellows disposed within the valve element and connecting the support to the portion of the valve element opposite said spring means, said bellows acting in opposition to said spring means, said casing being provided with outlet passage means spaced from said inlet passage, said support being provided with a plurality of radial arms and said valve element having longitudinal slots slidably-receiving said arms, said support being formed with a control media passage extending through one of said radial arms and communicating with the interior of said bellows.

References Cited
UNITED STATES PATENTS

| | | | |
|---|---|---|---|
| 1,171,695 | 2/1916 | Brady | 251—61.1 |
| 1,520,117 | 5/1923 | Buehle | 137—219 |
| 1,917,698 | 10/1928 | Carson | 251—61.1 X |
| 2,085,893 | 7/1937 | Boland | 137—219 |
| 2,704,547 | 4/1951 | Fox | 137—219 |
| 2,976,880 | 3/1961 | Cassarino et al. | 137—219 |

M. CARY NELSON, *Primary Examiner.*

J. R. DWELLE, *Assistant Examiner.*